United States Patent
Takahashi et al.

(10) Patent No.: US 7,891,339 B2
(45) Date of Patent: Feb. 22, 2011

(54) CONTROL APPARATUS CAPABLE OF SUITABLY CONTROLLING FUEL INJECTION APPARATUS REGARDLESS OF VARIATION IN FUEL PRESSURE IN ACCUMULATOR

(75) Inventors: Hidekazu Takahashi, Kariya (JP); Toyomori Tsuiki, Kariya (JP)

(73) Assignee: DENSO Corporation, Kariya (JP)

( * ) Notice: Subject to any disclaimer, the term of this patent is extended or adjusted under 35 U.S.C. 154(b) by 270 days.

(21) Appl. No.: 12/058,153

(22) Filed: Mar. 28, 2008

(65) Prior Publication Data

US 2008/0236547 A1    Oct. 2, 2008

(30) Foreign Application Priority Data

Mar. 29, 2007    (JP) .............................. 2007-088471

(51) Int. Cl.
    *F02M 63/00*    (2006.01)
(52) U.S. Cl. ....................................... 123/447; 123/465
(58) Field of Classification Search ................. 123/447, 123/456, 478, 480, 490
    See application file for complete search history.

(56) References Cited

U.S. PATENT DOCUMENTS

| | | | | |
|---|---|---|---|---|
| 4,777,921 A | * | 10/1988 | Miyaki et al. ................ | 123/456 |
| 6,354,274 B1 | * | 3/2002 | Shima et al. ................. | 123/478 |
| 6,408,823 B1 | * | 6/2002 | Takahashi et al. ........... | 123/456 |
| 6,729,297 B2 | * | 5/2004 | Futonagane et al. ......... | 123/299 |
| 6,755,179 B2 | * | 6/2004 | Asakawa ..................... | 123/478 |
| 7,267,097 B2 | * | 9/2007 | Tsutsui et al. ............... | 123/478 |
| 7,318,415 B2 | * | 1/2008 | Fukasawa .................... | 123/478 |
| 7,472,689 B2 | * | 1/2009 | Ishizuka et al. ............. | 123/446 |

FOREIGN PATENT DOCUMENTS

| | | |
|---|---|---|
| JP | 11-062676 | 3/1999 |
| JP | 2001-140689 | 5/2001 |
| JP | 2001-152949 | 6/2001 |
| JP | 2001-317397 | 11/2001 |
| JP | 2003-120845 | 4/2003 |

OTHER PUBLICATIONS

Japanese Office Action dated Nov. 11, 2008 issued in corresponding Japanese Application No. 2007-088471 with English Translation.

* cited by examiner

*Primary Examiner*—Stephen K Cronin
*Assistant Examiner*—Arnold Castro
(74) *Attorney, Agent, or Firm*—Nixon & Vanderhye P.C.

(57) ABSTRACT

A control apparatus is provided to control a fuel injection apparatus. The fuel injection apparatus includes an accumulator that accumulates high-pressure fuel, at least one injector that injects the high-pressure fuel accumulated in the accumulator into a cylinder of an internal combustion engine, and a pressure sensor that senses fuel pressure in the accumulator and outputs a signal indicative of the sensed fuel pressure. The control apparatus includes an estimator, a determiner, and a setter. The estimator estimates an actual injection duration of the injector. The determiner determines, during the actual injection duration estimated by the estimator, a value of the fuel pressure in the accumulator based on the signal output from the pressure sensor. The setter sets a manipulated variable for controlling fuel injection quantity of the injector based on the value of the fuel pressure determined by the determiner.

20 Claims, 8 Drawing Sheets

CONTROL APPARATUS CAPABLE OF SUITABLY CONTROLLING FUEL INJECTION APPARATUS REGARDLESS OF VARIATION IN FUEL PRESSURE IN ACCUMULATOR

CROSS-REFERENCE TO RELATED APPLICATION

This application is based on and claims priority from Japanese Patent Application No. 2007-88471, filed on Mar. 29, 2007, the content of which is hereby incorporated by reference in its entirety into this application.

BACKGROUND OF THE INVENTION

1. Technical Field of the Invention

The present invention relates to a control apparatus for controlling a fuel injection apparatus; the latter includes an accumulator for accumulating high-pressure fuel, at least one injector for injecting the high-pressure fuel accumulated in the accumulator into a cylinder of an internal combustion engine, and a pressure sensor for sensing the fuel pressure in the accumulator.

2. Description of the Related Art

There is known a fuel injection apparatus that includes a common rail (i.e., a common accumulator) for accumulating high-pressure fuel, a plurality of injectors for injecting the high-pressure fuel accumulated in the common rail into corresponding cylinders of a diesel engine, and a pressure sensor for sensing the fuel pressure in the common rail.

In such a fuel injection apparatus, it is possible to suitably set a target value of the fuel pressure in the common rail according to the operating condition of the engine; thus, it is also possible to suitably control the pressure of fuel supplied to injectors.

Moreover, there is also known a control apparatus that controls the fuel injection apparatus by manipulating the injectors.

Specifically, the control apparatus is configured to set, for each of the injectors, a command injection duration (i.e., a command value of fuel injection duration) on the basis of a command injection quantity (i.e., a command value of fuel injection quantity) and a value of the fuel pressure in the common rail sensed by the pressure sensor. More specifically, the fuel injection quantity of the injector depends not only on the injection duration but also on the fuel pressure in the common rail; in other words, there is a certain relationship among the injection quantity, the injection duration, and the fuel pressure. Therefore, it is possible for the control apparatus to determine the command injection duration on the basis of the relationship among the three parameters. After that, the control apparatus manipulates the injector to open for the set command injection duration, thereby injecting the command injection quantity of high-pressure fuel into the corresponding cylinder.

Furthermore, the fuel pressure in the common rail generally varies with time. To suitably control the fuel injection apparatus regardless of the variation in the fuel pressure, there is disclosed a method in Japanese Patent First Publication No. 2001-152949. According to the method, the control apparatus is further configured to: 1) set a preliminary command injection duration on the basis of a first value of the fuel pressure which is sensed by the pressure sensor before an energization of the injector; 2) set a final command injection duration on the basis of a second value of the fuel pressure which is sensed by the pressure sensor when the energization of the injector starts. With this configuration, it is possible for the control apparatus to more suitably set the command injection duration (i.e., the final one) on the basis of a value of the fuel pressure (i.e., the second value) which is sensed at a timing as close to the actual fuel injection as possible.

However, when feed durations, during which a fuel pump feeds the high-pressure fuel into the common rail, overlap with the injection durations of the injectors, the fuel pressure in the common rail will be changed not only due to the fuel injections by the injectors but also the fuel feeds by the pump. Therefore, in such a case, it may be difficult to suitably set the final command injection duration on the basis of the second value of the fuel pressure which is sensed at the start of the energization. In particular, in an asynchronous fuel injection system where the feed durations are not in one-to-one relationship with the injection durations, there will be part of the injectors whose injection durations overlap with the feed durations and the others whose injection durations do not. Accordingly, there will be part of the injectors which actually inject more fuel than the command injection quantity and the others which actually inject less fuel than the command injection quantity.

SUMMARY OF THE INVENTION

The present invention has been made in view of the above-mentioned problems.

It is, therefore, a first object of the present invention to provide a control apparatus for controlling a fuel injection apparatus having a common rail, which can suitably control the fuel injection apparatus regardless of variation in the fuel pressure in the common rail.

It is a second object of the present invention to provide a fuel injection system which includes a fuel injection apparatus with a common rail and a control apparatus that can suitably control the fuel injection apparatus regardless of variation in the fuel pressure in the common rail.

According to one aspect of the present invention, there is provided a control apparatus for controlling a fuel injection apparatus. The fuel injection apparatus includes: an accumulator that accumulates high-pressure fuel; at least one injector that injects the high-pressure fuel accumulated in the accumulator into a cylinder of an internal combustion engine; and a pressure sensor that senses fuel pressure in the accumulator and outputs a signal indicative of the sensed fuel pressure. The control apparatus includes: an estimator that estimates an actual injection duration of the injector; a determiner that determines, during the actual injection duration estimated by the estimator, a value of the fuel pressure in the accumulator based on the signal output from the pressure sensor; and a setter that sets a manipulated variable for controlling fuel injection quantity of the injector based on the value of the fuel pressure determined by the determiner.

With the above configuration, the manipulated valuable is set on the basis of the value of the fuel pressure which is determined when the injector actually injects the high-pressure fuel. Therefore, the set manipulated valuable can reflect the actual behavior of the fuel pressure in the accumulator during the fuel injections by the injector. Accordingly, the control apparatus can suitably control the fuel injection quantity of the injector with the manipulated variable.

According to a further implementation of the invention, the control apparatus further includes a memory that stores at least one piece of information; the piece of information is on the value of the fuel pressure determined by the determiner. The injector cyclically injects the high-pressure fuel accumulated in the accumulator into the cylinder of the engine. The setter sets, based on the piece of information stored in the memory, the manipulated variable for a next fuel injection that is to be made by the injector after the actual injection duration during which the value of the fuel pressure is determined.

In some cases, the actual injection duration of the injector may largely deviate from the command injection duration; accordingly, it is difficult to set the manipulated variable based on the value of the fuel pressure for the present fuel injection during which the value of the fuel pressure is determined. Therefore, in the above implementation, the manipulated variable is set for the next fuel injection based on the piece of information stored in the memory. With such a configuration, it is possible for the control apparatus to suitably control the fuel injection quantity of the injector regardless of the deviation of the actual injection duration from the command injection duration.

Further, the piece of information may indicate a difference between the value of the fuel pressure determined during the actual injection duration and a second value of the fuel pressure in the accumulator; the second value is determined by the determiner, based on the signal output from the pressure sensor, at a timing earlier than the actual injection duration by a predetermined crank angle. The determiner may further determine, at a timing earlier than the next fuel injection by the predetermined crank angle, a third value of the fuel pressure in the accumulator based on the signal output from the pressure sensor. The setter may set, based on the piece of information and the third value of the fuel pressure determined by the determiner, the manipulated variable for the next fuel injection.

The engine may have a plurality of cylinders, and the fuel injection apparatus may include a plurality of injectors each of which injects the high-pressure fuel accumulated in the accumulator into a corresponding one of the cylinders of the engine. The memory may store, for each of the injectors, a piece of information on a value of the fuel pressure in the accumulator which is determined by the determiner, based on the signal output from the pressure sensor, during an actual injection duration of the injector estimated by the estimator. The setter may set, for each of the injectors, the manipulated variable for a next fuel injection, which is to be made by the injector after the actual injection duration of the injector, based on the piece of information stored in the memory for the injector. Moreover, the fuel injection apparatus may further include a pump that is driven by an output shaft of the engine; suction and discharge strokes of the pump may be determined as a function of rotation angle of the output shaft of the engine.

On the other hand, the engine may have a plurality of operating regions. The memory may store, for each of the operating regions of the engine, a piece of information on a value of the fuel pressure in the accumulator which is determined by the determiner during an actual injection duration of the injector with the engine operating in the operating region. The setter may set, for each of the operating regions of the engine, the manipulated variable for a next fuel injection, which is to be made by the injector with the engine operating in the operating region, based on the piece of information stored in the memory for the operating region. Further, the operating regions of the engine may be divided according to at least one of the fuel pressure in the accumulator and the fuel injection quantity of the injector.

Preferably, the determiner determines the value of the fuel pressure in the accumulator at the middle of the actual injection duration of the injector. Otherwise, the determiner may preferably determine the value of the fuel pressure in the accumulator when the injector has injected a half of a command injection quantity.

The determiner may further determine, during the actual injection duration of the injector, a plurality of values of the fuel pressure in the accumulator based on the signal output from the pressure sensor. The setter may set the manipulated variable based on an average of all the values of the fuel pressure determined by the determiner.

The estimator may further estimate: 1) a first delay of an actual injection start timing with respect to a command injection start timing based on a second value of the fuel pressure in the accumulator, the second value being determined by the determiner prior to the actual injection duration; 2) a second delay of an actual injection end timing with respect to a command injection end timing based on a command injection duration and the second value of the fuel pressure; 3) and the actual injection duration based on the first and second delays and the command injection duration.

The injector may cyclically inject the high-pressure fuel accumulated in the accumulator into the cylinder of the engine. The determiner may determine the value of the fuel pressure in the accumulator at a timing that is determined based on at least one of a time interval, a command injection duration, a command injection start timing, and a second value of the fuel pressure in the accumulator; the time interval is between a last fuel injection of the injector and the actual injection duration estimated by the estimator; the second value is determined by the determiner in the time interval.

The engine may have a plurality of cylinders, and the fuel injection apparatus may include a plurality of injectors each of which injects the high-pressure fuel accumulated in the accumulator into a corresponding one of the cylinders of the engine. The fuel injection apparatus may further include a pump that cyclically feeds the high-pressure fuel into the accumulator. The cycle of the fuel injections by the injectors may be different from that of the fuel feeds by the pump.

The injector may cyclically inject the high-pressure fuel accumulated in the accumulator into the cylinder of the engine. The manipulated variable may be a command injection duration for a next fuel injection that is to be made by the injector after the actual injection duration during which the value of the fuel pressure is determined.

According to another aspect of the present invention, there is provided a fuel injection system which includes a fuel injection apparatus and a control apparatus as described above.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
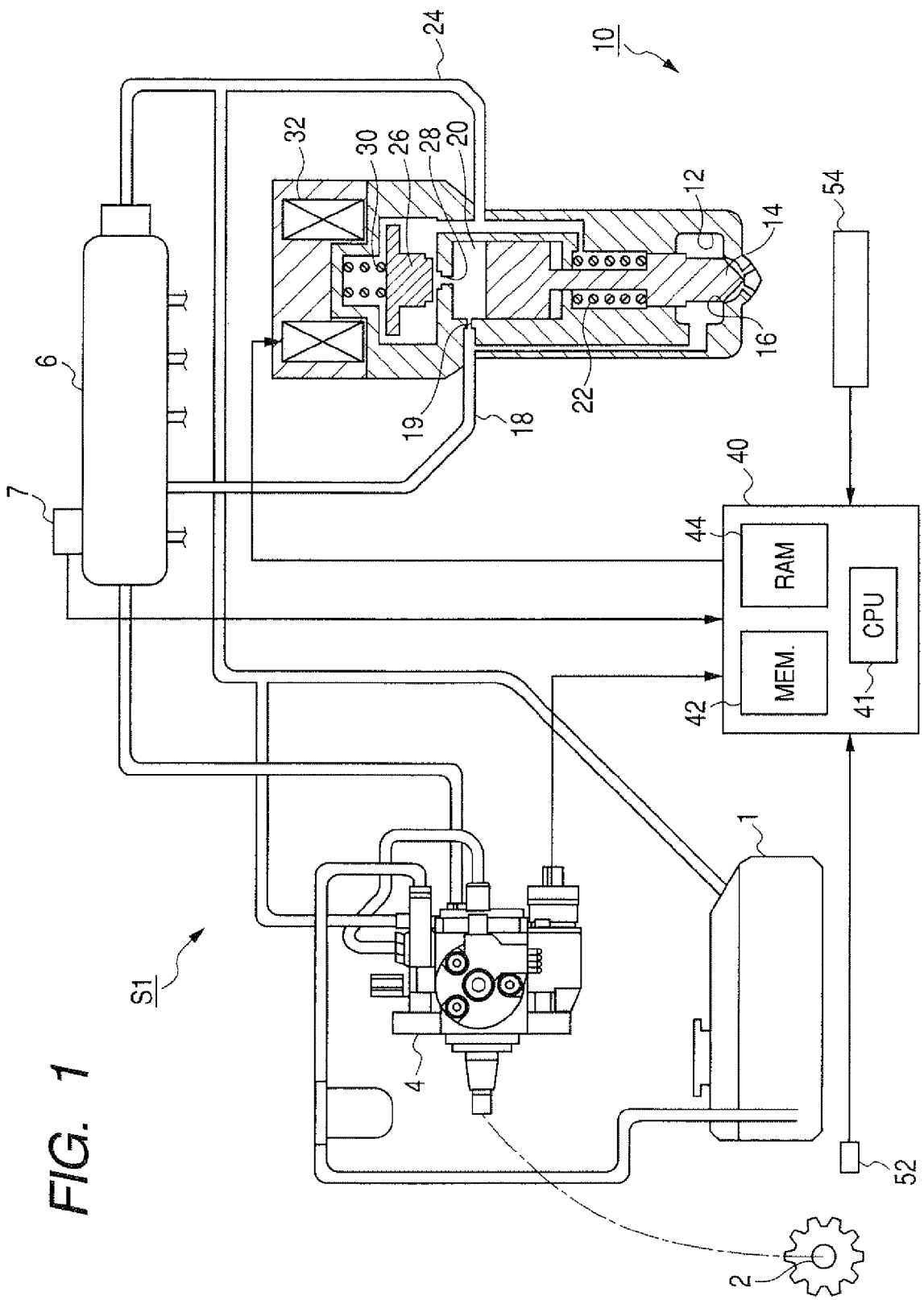
FIG. 1 is a schematic view showing the overall configuration of a fuel injection system according to the first embodiment of the invention.

Preferred embodiments of the present invention will be described hereinafter with reference to FIGS. 1-9.

It should be noted that, for the sake of clarity and understanding, identical components having identical functions in different embodiments of the invention have been marked, where possible, with the same reference numerals in each of the figures.

First Embodiment

FIG. 1 shows the overall configuration of a fuel injection system S1 according to the first embodiment of the invention.

As shown in FIG. 1, fuel in a fuel tank 1 is drawn up by a fuel pump 4 that is driven by an output shaft of a diesel engine. The fuel pump 4 includes two plungers, through reciprocations of which the fuel pump 4 draws up the fuel, pressurizes it, and discharges the resultant high-pressure fuel.

A common rail 6 receives and accumulates therein the high-pressure fuel discharged from the fuel pump 4. A pressure sensor 7 is mounted on the common rail 6, which senses the fuel pressure in the common rail 6 and outputs a signal indicative of the sensed fuel pressure.

A plurality of injectors 10 are connected to the common rail 6 to receive the high-pressure fuel. More particularly, in the present embodiment, there are five injectors 10 connected to the common rail 6, only one of which is shown in detail in FIG. 1 for the sake of simplicity.

Each of the injectors 10 is configured to inject the high-pressure fuel received from the common rail 6 into a corresponding one of five cylinders of the engine. More specifically, in each of the injectors 10, there is formed a cylindrical needle-receiving portion 12 at the tip end of the injector 10. In the needle-receiving portion 12, there is received a nozzle needle 14 that is movable in the axial direction of the injector 10. When the nozzle needle 14 rests on an annular needle-seat 16 formed in the needle-receiving portion 12, the needle-receiving portion 12 is isolated from the combustion chamber of the corresponding cylinder. On the contrary, when the nozzle needle 14 is detached from the needle-seat 16, the needle-receiving portion 12 communicates with the combustion chamber. Moreover, the needle-receiving portion 12 is filled with the high-pressure fuel supplied thereto from the common rail 6 via a high-pressure fuel passage 18.

The nozzle needle 14 has a back end that is opposite to the tip end of the nozzle needle 14 and faces a back pressure chamber 20. The back pressure chamber 20 receives the high-pressure fuel supplied thereto from the common rail 6 via an orifice 19. Moreover, around a central portion of the nozzle needle 14, there is provided a needle spring 22, which urges the nozzle needle 14 toward the tip of the injector 10.

A valve 26 is provided to fluidically connect and disconnect the back pressure chamber 20 to and from a low-pressure fuel passage 24 that communicates with the fuel tank 1. More specifically, when an orifice 28 provided between the back pressure chamber 20 and the low-pressure fuel passage 24 is closed by the valve 26, the back pressure chamber 20 is isolated from the low-pressure fuel passage 24. On the contrary, when the orifice 28 is opened, the back pressure chamber 20 communicates with the low-pressure fuel passage 24.

The valve 26 is pressed by a valve spring 30 toward the back pressure chamber 20. Further, the valve 26 can move backward upon being attracted a solenoid 32.

When the solenoid 32 is deenergized, the valve 26 is pressed by the force of the valve spring 30 to close the orifice 28. Consequently, the back pressure chamber 20 is isolated from the low-pressure fuel passage 24, while keeping communication with the high-pressure fuel passage 18 via an orifice 19. As a result, the nozzle needle 14 is pressed by the force of the needle spring 22 to rest on the needle-seat 16, thereby closing the injector 10.

On the contrary, when the solenoid 32 is energized, the magnetic attraction created by the solenoid 32 attracts the valve 26 to move backward, thereby opening the orifice 28. Consequently, the high-pressure fuel in the back pressure chamber 20 flows out to the low-pressure fuel passage 24 via the orifice 28. As a result, the difference in fuel pressure between the needle-receiving portion 12 and the back pressure chamber 20 causes the nozzle needle 14 to move backward against the force of the needle spring 22, thereby opening the injector 10.

The fuel injection system S1 also includes an Electronic Control Unit (ECU) 40. The ECU 40 is configured with a CPU 41, a memory 42 whose contents can always be retained, and a RAM 44. The memory 42 may be made up of a RAM that is equipped with a backup power source so as to retain its contents when the ECU 40 is not powered. Alternatively, the memory 42 may also be made up of an EEPROM.

The ECU 40 controls the combustion in the engine on the basis of the operating condition of the engine and the amount of manipulation of an accelerator pedal. The operating condition of the engine is represented by values of parameters sensed by various sensors, such as a value of the fuel pressure in the common rail 6 sensed by the pressure sensor 7 and a value of the rotation angle of a crank shaft 2 sensed by a crank angle sensor 52. On the other hand, the amount of manipulation of the accelerator pedal is sensed by an accelerator sensor 54.

To suitably control the combustion in the engine, in the present embodiment, the ECU 40 controls the injections of the high-pressure fuel into the cylinders of the engine in the following manner.

The ECU 40 sets a target value of the fuel pressure in the common rail 6 on the basis of a command injection quantity for each of the injectors 10 and the rotational speed of the crank shaft 2. Then, the ECU 40 controls the fuel pump 4 so as to bring the actual fuel pressure in the common rail 6 into agreement with the set target value. On the other hand, the ECU 40 also sets, for each of the injectors 10, the command injection quantity and a command injection start timing on the basis of an operator's request and the operating condition of the engine. Then, the ECU 40 sets a command injection duration on the basis of the set command injection quantity and a value of the fuel pressure in the common rail 6 which is sensed by the pressure sensor 7. After that, the ECU 40 controls the energization of each of the injectors 10 on the basis of the set command injection duration and command injection start timing.

Figure 2:
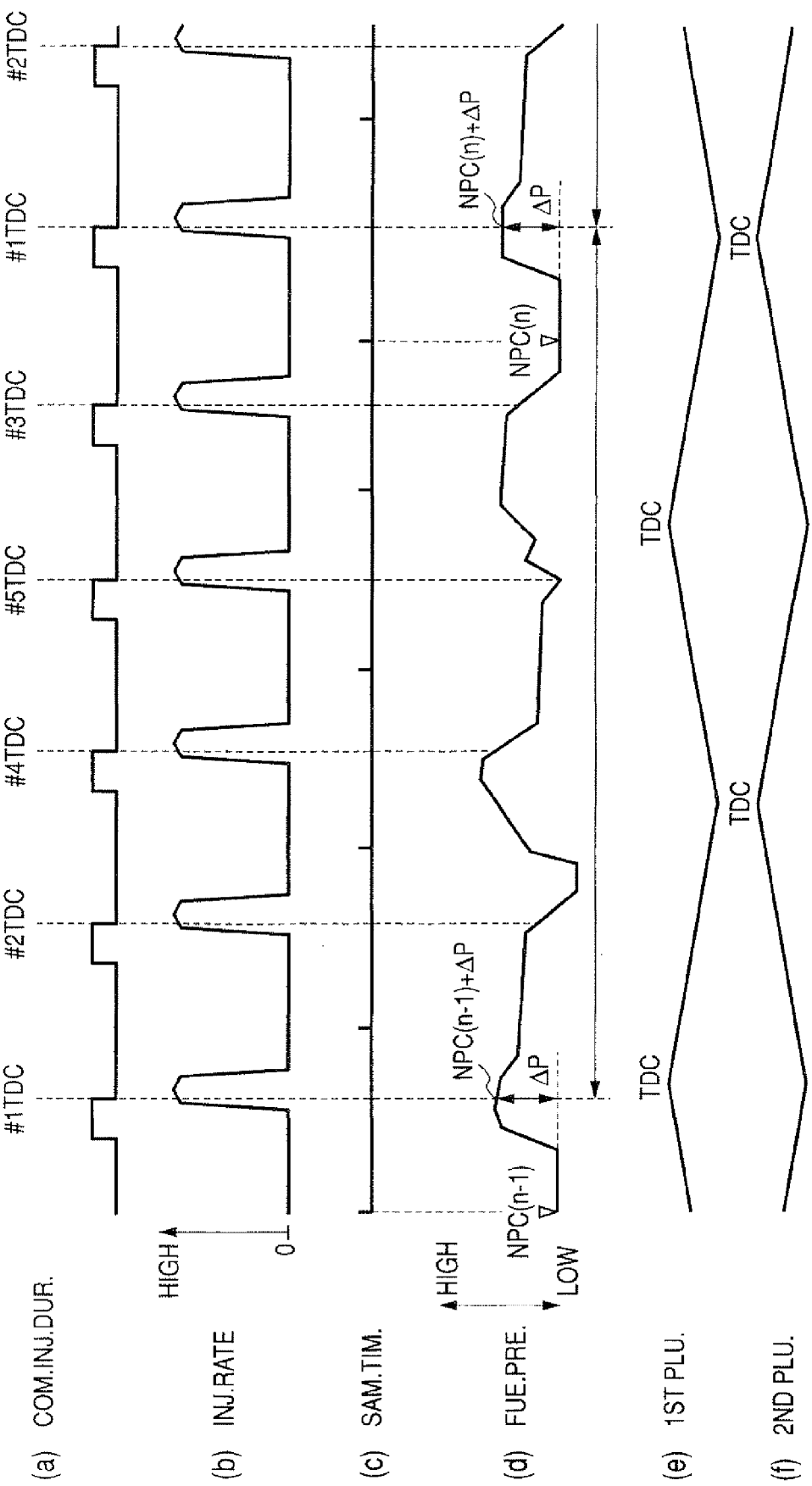
FIG. 2 is a graphical representation illustrating the manner in which fuel injections and fuel feeds are made in the fuel injection system.

In the present embodiment, the fuel injections by the injectors 10 and the fuel feeds by the fuel pump 4 are made in a manner as shown in FIG. 2, where the first time chart (a) indicates the command injection duration for each of the injectors 10, the second time chart (b) indicates the change in injection rate for each of the injectors 10, the third time chart (c) indicates the sampling timings of the fuel pressure in the common rail 6, the fourth time chart (d) indicates the change in the fuel pressure in the common rail 6, the fifth time chart (e) indicates the motion of the first plunger of the fuel pump 4, and the sixth time chart (f) indicates the motion of the second plunger of the fuel pump 4.

In addition, in FIG. 2, the compression top dead centers of the cylinders of the engine, each of which corresponds to one of the injectors 10, are indicated above the time chart (a) with #1 TDC-#5 TDC; the compression top dead centers of the first plunger of the fuel pump 4 are indicated above the time chart (e) with TDC; the compression top dead centers of the second plunger of the fuel pump 4 are indicated above the time chart (f) with TDC; NPC (n−1) and NPC (n) respectively represent the values of the fuel pressure in the common rail 6 sampled for the first injector 10 in the (n−1)th and nth cycles.

As shown in FIG. 2, in the present embodiment, the injections of the high-pressure fuel in the common rail 6 into the cylinders of the engine are cyclically performed by the injectors 10 at even intervals of 144° CA (Crank Angle). In comparison, the feeds of the high-pressure fuel into the common rail 6 are cyclically performed by the plungers of the fuel pump 4 at even intervals of 240° CA. That is, the fuel injection system S1 according to the present embodiment is an asynchronous system where the cycle of the fuel injections by the injectors 10 is different from that of the fuel feeds by the fuel pump 4. Accordingly, for each of the cylinders of the engine, the difference in crank angle between the compression top dead center of the cylinder and a closest one of the compression top dead centers of the plungers of the fuel pump 4 is different from that for any other cylinder. Therefore, for each of the injectors 10, the behavior of the fuel pressure in the common rail 6 during the fuel injections by the injector 10 is different from that during the fuel injections by any other injector 10.

For example, in FIG. 2, the fuel injection durations of the second injector 10 (i.e., the injector 10 corresponding to #2 TDC) do not overlap with the fuel feed durations of both the plungers of the fuel pump 4. Therefore, the fuel pressure in the common rail 6 monotonically decreases during the fuel injections by the second injector 10. In comparison, the fuel injection durations of the first injector 10 (i.e., the injector 10 corresponding to #1 TDC) overlap with the fuel feed durations of the first plunger of the fuel pump 4. Therefore, the fuel pressure in the common rail 6 does not always decrease during the fuel injections by the first injector 10, and even when it decreases, the degree of the decrease is much smaller than that during the fuel injections by the second injector 10.

Accordingly, it is impossible to suitably set the command injection duration for each of the injectors 10 on the basis of a value of the fuel pressure in the common rail 6 which is sensed by the pressure sensor 7 at a timing earlier than the compression top dead center of the corresponding cylinder by a predetermined crank angle.

However, it can be seen, at the same time, that the behavior of the fuel pressure in the common rail 6 is cyclic with respect to the fuel injections made by the same injector 10. More specifically, in the present embodiment, the differences in crank angle between the compression top dead centers of the cylinders of the engine and the compression top dead centers of the plungers of the fuel pump 4 change in a cycle of four strokes (i.e., 720°). Therefore, for each of the injectors 10, the relationship between the compression top dead center of the corresponding cylinder and the compression top dead centers of the plungers of the fuel pump 4 is unique.

Accordingly, for each of the injectors 10, assuming the same operating condition of the engine, the fuel pressure in the common rail 6 behaves almost in the same manner for all the fuel injections made by the same injector 10. Therefore, as illustrated for the first injector 10 in FIG. 2, the difference in the (n−1)th cycle between the value of the fuel pressure which is sampled prior to the actual fuel injection by the predetermined crank angle and a value of the fuel pressure sampled during the actual fuel injection is equal to that in the nth cycle. In other words, the value of the fuel pressure during the actual fuel injection in the nth cycle can be estimated as the sum of NPC (n) and ΔP, where NPC (n) is the value of the fuel pressure sampled (or sensed) prior to the actual fuel injection in the nth cycle, as described above, and ΔP is a fuel pressure variation that is predetermined as the difference between the values of the fuel pressure sampled prior to and during the actual fuel injection in the (n−1)th cycle.

Figure 3:
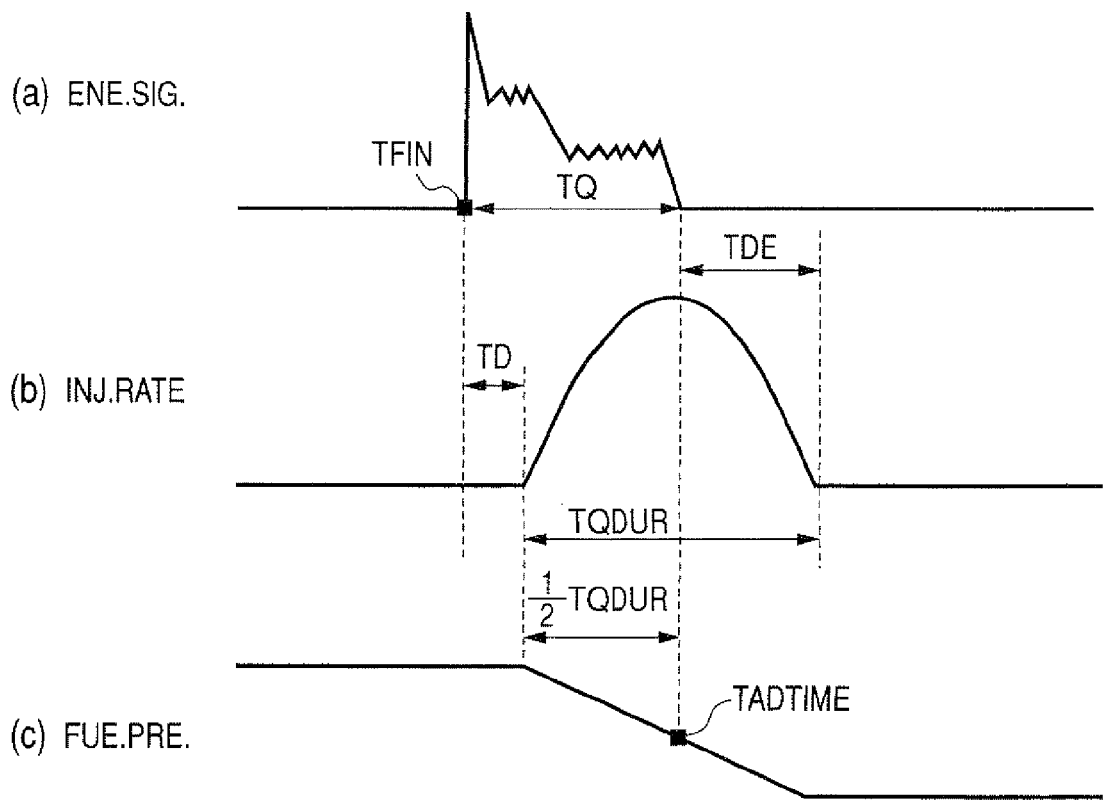
FIG. 3 is a graphical representation illustrating the setting of a timing for determining the fuel pressure in a common rail in the fuel injection system.

Referring further to FIG. 3, in the present embodiment, the value of the fuel pressure during the actual fuel injection for determining the variation ΔP is also sensed by the pressure sensor 7 at a timing TADTIME set to the middle of the actual injection duration TQDUR.

More specifically, in FIG. 3, the first time chart (a) indicates the change in an energization signal for the injector 10, the second time chart (b) indicates the change in the injection rate of the injector 10, and the third time chart (c) indicates the change in the fuel pressure in the common rail 6. In addition, for the sake of simplicity, in FIG. 3, the change in the fuel pressure is assumed to be caused only by the fuel injection by the injector 10 (i.e., no fuel feed by the fuel pump 4). In this case, the fuel pressure in the common rail 6 monotonically decreases with the fuel injection by the injector 10. Therefore, the value of the fuel pressure at the middle of the actual injection duration TQDUR can be considered as the mean value of the fuel pressure over the actual injection duration TQDUR. Accordingly, in the present embodiment, the variation ΔP is predetermined as the difference between the two values of the fuel pressure which are respectively sensed, by the pressure sensor 7, at the timing earlier than the compression top dead center of the corresponding cylinder by the predetermined crank angle and the timing TADTIME set to the middle of the actual injection duration TQDUR.

Figure 4:
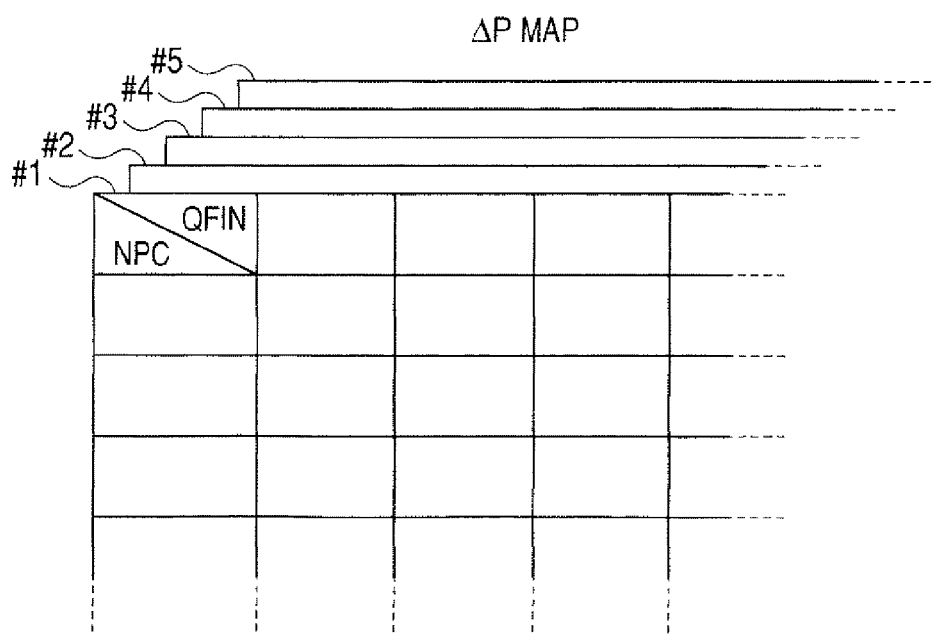
FIG. 4 is a schematic view illustrating the manner in which fuel pressure variations ΔP are stored in a RAM of an ECU in the fuel injection system.

Further, in the present embodiment, for each of a plurality of operating regions of the engine, a variation ΔP is determined and stored in a corresponding storage area in the RAM 44. More specifically, as shown in FIG. 4, for each of the injectors 10 (indicated with #1-#5), a variation ΔP is determined for each of the operating regions of the engine, which are divided according to the fuel pressure (NPC) in the common rail 6 and the injection quantity (QFIN) of the injectors 10, and stored in the RAM 44 in the form of a map. Here, the fuel pressure in the common rail 6 is used for the division of the operating regions of the engine because the higher the fuel pressure, the more the fuel pressure decreases through the fuel injections by the injectors 10; the fuel injection quantity is used for the division because the larger the injection quantity, the more the fuel pressure decreases through the fuel injections.

Figure 5:
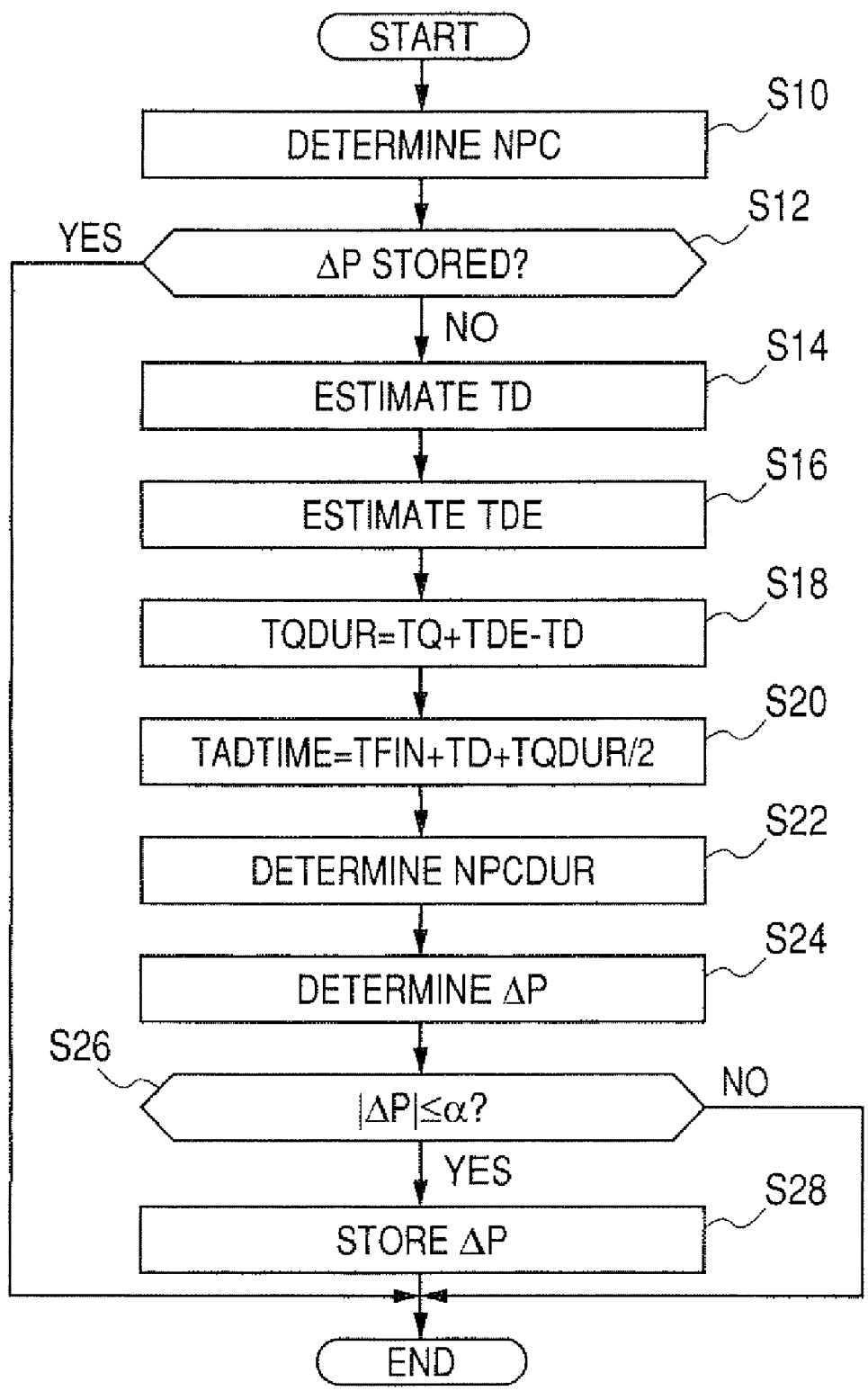
FIG. 5 is a flow chart illustrating a process of the ECU for determining the fuel pressure variations ΔP.

FIG. 5 shows a process of the CPU 41 of the ECU 40 for determining variations ΔP for each of the injectors 10. This process is performed once for each of the fuel injections by the injector 10.

First, at step S10, the CPU 41 determines, at the timing earlier than the compression top dead center of the corresponding cylinder by the predetermined crank angle, a value NPC of the fuel pressure in the common rail 6 on the basis of the signal output from the pressure sensor 7.

At the step S12, the CPU 41 determines whether a variation ΔP for the injector 10, which corresponds to the current command injection quantity QFIN and the value NPC determined at step S10, has already been stored in the map shown in FIG. 4.

In addition, the command injection quantity QFIN and the command injection start timing TFIN have been set, prior to entering the present process, by the CPU 41 on the basis of an operator's request and the current operating condition of the engine.

If the determination at step S12 produces a "YES" answer, then the process directly goes to the end without further determining the variation ΔP.

On the contrary, if the determination at step S12 produces a "NO" answer, then the process proceeds to step S14.

At step S14, the CPU 41 estimates, on the basis of the value NPC of the fuel pressure determined at step S10, a delay TD of the actual injection start timing with respect to the command injection start timing TFIN.

That is, as shown in FIG. 3, the delay TD is estimated as the time interval between the start of energization of the injector 10 and the start of the actual fuel injection by the injector 10. Referring back to FIG. 1, the delay TD also represents the time period in which: the solenoid 32 of the injector 10 is energized to cause the fuel pressure in the back pressure chamber 20 to decrease; and thus the difference in fuel pressure between the needle-receiving portion 12 and the back pressure chamber 20 is increased to cause the nozzle needle 14 to move backward, thereby opening the injector 10. Therefore, the delay TD depends on both the fuel pressure in the needle-receiving portion 12 and the fuel pressure in the back pressure chamber 20. More specifically, the delay TD increases with the fuel pressure in the needle-receiving portion 12, i.e., with the fuel pressure in the common rail 6. In the present embodiment, such a relationship between the delay TD and the fuel pressure in the common rail 6 has been previously determined through experimentation and stored in the memory 42 in the form of a map; on the basis of this map, the delay TD is estimated at step. S14.

At step S16 the CPU 41 further estimates, on the basis of a command injection duration TQ and the value NPC of the fuel pressure in the common rail 6 determined at step S10, a delay TDE of the actual injection end timing with respect to the command injection end timing.

The command injection duration TQ here represents, as shown in FIG. 3, the energization duration of the injector 10; it has been set, prior to step S16, by performing a process shown in FIG. 6 to be described later.

As shown in FIG. 3, the delay TDE is estimated as the time interval between the end of energization of the injector 10 and the end of the actual fuel injection by the injector 10. Referring again to FIG. 1, the delay TDE also represents the time period in which: the solenoid 32 of the injector 10 is deenergized to cause the fuel pressure in the back pressure chamber 20 to increase; and thus the difference in fuel pressure between the needle-receiving portion 12 and the back pressure chamber 20 is decreased to cause the nozzle needle 14 to rest on the needle-seat 16, thereby closing the injector 10.

Therefore, the delay TDE depends on the pressure of the fuel supplied to the injector 10, i.e., on the fuel pressure in the common rail 6. The delay TDE also depends on the amount of lift of the nozzle needle 14 when the nozzle needle 14 starts to move toward the needle-seat 16. Further, this amount of lift of the nozzle needle 14 is related to the command injection duration TQ. In the present embodiment, such a relationship among the delay TDE, the command injection duration TQ, and the fuel pressure in the common rail 6 has been previously determined through experimentation and stored in the memory 42 in the form of a map; on the basis of this map, the delay TDE is estimated at step S16.

At step S18, the CPU 41 estimates the actual injection duration TQDUR by the following equation:

$$TQDUR = TQ + TDE - TD \quad \text{(EQUATION 1)}$$

where, as described above, TQ, TDE, and TD respectively represent the command injection duration, the delay of the actual injection end timing with respect to the command injection end timing, and the delay of the actual injection start timing with respect to the command injection start timing.

At step S20, the CPU 41 sets the timing TADTIME, at which a value NPCDUR of the fuel pressure in the common rail 6 is to be determined, by the following equation:

$$TADTIME = TFIN + TD + TQDUR/2 \quad \text{(EQUATION 2)}$$

where TFIN represents, as shown in FIG. 3, the command injection start timing (i.e., the timing at which the energization of the injector 10 starts).

At step S22, the CPU 41 determines, at the timing TADTIME set at step S20, the value NPCDUR of the fuel pressure in the common rail 6 on the basis of the signal output from the pressure sensor 7.

At step S24, the CPU 41 determines the variation ΔP that corresponds to the current operating condition of the engine by subtracting the value NPC determined at step S10 from the value NPCDUR determined at step S22.

At step S26, the CPU 41 makes a determination as to whether the absolute value of the variation ΔP determined at step S24 is less than or equal to a predetermined threshold α.

This step S26 is performed for evaluating the reliability of the variation ΔP determined at step S24. More specifically, when the signal output from the pressure sensor 7 involves noises and thus the fuel pressure sensed by the pressure sensor 7 largely deviates from the actual fuel pressure, the absolute value of the variation ΔP will be excessively large. Therefore, the reliability of the variation ΔP can be evaluated through the determination at step S26.

If the determination at step S26 produces a "YES" answer, then the process proceeds to step S28, at which the variation ΔP determined at step S24 is stored in the corresponding storage area in the RAM 44 (or the corresponding operating region on the map shown in FIG. 4). After that, the process goes to the end.

More specifically, in this case, the variation ΔP is evaluated as being reliable, and is thus retained in the RAM 44.

On the contrary, if the determination at step S26 produces a "NO" answer, then the process directly goes to the end without storing the variation ΔP in the RAM 44.

More specifically, in this case, the variation ΔP determined at step S24 is evaluated as being unreliable, and is thus discarded.

Figure 6:
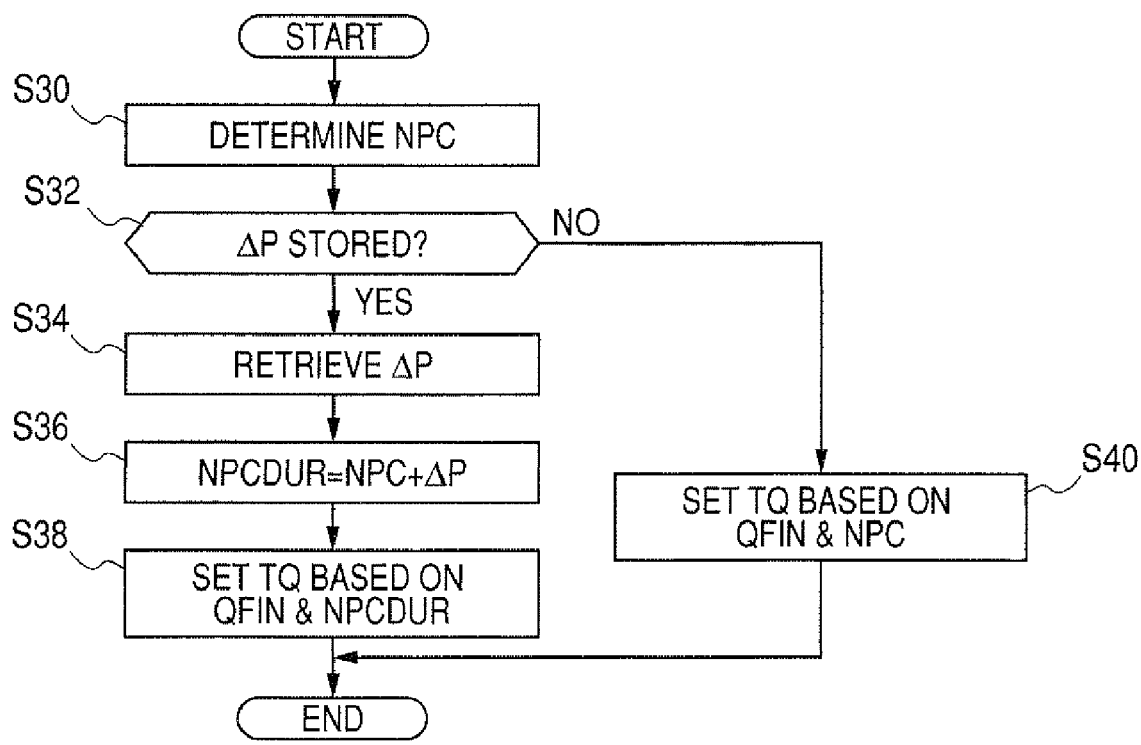
FIG. 6 is a flow chart illustrating a process of the ECU for setting a command injection duration.

FIG. 6 shows a process of the CPU 41 of the ECU 40 for setting the command injection duration TQ for each of the injectors 10. This process is performed once before each of the fuel injections by the injector 10.

First, at step S30, the CPU 31 determines, at the timing earlier than the compression top dead center of the corresponding cylinder by the predetermined crank angle, the value NPC of the fuel pressure in the common rail 6 on the basis of the signal output from the pressure sensor 7.

It should be noted that this step is the same as step S10 in the process shown in FIG. 5.

At succeeding step S32, the CPU 41 determines whether the variation ΔP for the injector 10, which corresponds to the current command injection quantity QFIN and the value NPC determined at step S30, has already been stored on the map shown in FIG. 4.

In addition, the command injection quantity QFIN and the command injection start timing TFIN have been set, prior to entering the present process, by the CPU 41 on the basis of an operator's request and the current operating condition of the engine.

If the determination at step S32 produces a "YES" answer, then the process proceeds to step S34.

At step S34, the CPU 41 retrieves the variation ΔP from the map (i.e., from the RAM 44).

At step S36, the CPU 41 estimates a value NPCDUR of the fuel pressure in the common rail 6 by the following equation:

$$NPCDUR = NPC + \Delta P \quad \text{(EQUATION 3)}$$

where, NPC and ΔP have been respectively obtained by steps S30 and S34.

Here, the value NPCDUR represents the fuel pressure in the common rail 6 during the upcoming fuel injection by the injector 10.

At step S38, the CPU 41 sets, on the basis of the value NPCDUR estimated at step S38 and the command injection quantity QFIN, the command injection duration TQ for the upcoming fuel injection by the injector 10. Then, the process goes to the end.

On the other hand, if the determination at step S32 produces a "NO" answer, then the process proceeds to step S40.

At step S40, the CPU 41 sets, on the basis of the command injection quantity QFIN and the value NPC determined at step S30, the command injection duration TQ for the upcoming fuel injection by the injector 10. Then, the process goes to the end.

In addition, in this case, the CPU 41 determines, during the upcoming fuel injection, the valuation ΔP by performing the process shown in FIG. 5 on the basis of the command injection duration TQ set at step S40.

Moreover, after the above process, the CPU 41 controls the energization of the injector 10 for the upcoming fuel injection, so that the injector 10 is energized from the command injection start timing TFIN over the command injection duration TQ set at either step S38 or step S40.

By performing the process shown in FIG. 6, the CPU 41 can estimate the value NPCDUR representing the fuel pressure in the common rail 6 during the upcoming fuel injection and set the command injection duration TQ for the upcoming fuel injection on the basis of the estimated value NPCDUR. Accordingly, once the variations ΔP have been stored for the corresponding operating regions of the engine, it is possible for the CPU 41 to suitably estimate the value NPCDUR for each of the actual fuel injections regardless of changes in the operating condition of the engine.

The above-described ECU 40 according to the present embodiment has the following advantages.

In the present embodiment, the ECU 40 estimates, for each of the fuel injections by the injectors 10, the value NPCDUR representing the fuel pressure in the common rail 6 during the fuel injection, on the basis of the value NPC of the fuel pressure determined at a timing earlier than the fuel injection by the predetermined crank angle and the variation ΔP corresponding to the current operating condition of the engine. Accordingly, based on the estimated value NPCDUR of the fuel pressure, the ECU 40 can suitably set the command injection duration TQ for the fuel injection.

In the present embodiment, the ECU 40 determines and stores the variations ΔP for each of the injectors 10. Accordingly, the ECU 40 can suitably set, for each of the injectors 10, the command injection duration TQ for the fuel injections made by the injector 10.

In the present embodiment, the ECU 40 determines and stores the variations ΔP for each of the operating regions of the engine which are divided according to the fuel pressure in the common rail 6 and the injection quantity of the injectors 10. Accordingly, the CPU 40 can suitably set, for each of the operating regions of the engine, the command injection duration TQ for the fuel injections made by the injectors 10 with the engine operating in that operating region.

In the present embodiment, in determining each of the variations ΔP, the ECU 40 estimates the actual injection duration TQDUR, determines the value NPCDUR of the fuel pressure in the common rail 6 during the estimated duration TQDUR, and determines the variation ΔP on the basis of the determined value NPCDUR. Therefore, the variation ΔP can accurately reflect the actual behavior of the fuel pressure in the common rail 6 during the fuel injection by the injector 10; thus, the CPU 40 can suitably set the command injection duration TQ for a next fuel injection by the injector 10 on the basis of the variation ΔP regardless of variation in the fuel pressure in the common rail 6.

Further, in estimating the actual injection duration TQDUR, the ECU 40 estimates the delay TD on the basis of the value NPC of the fuel pressure in the common rail 6, and estimates the delay TDE on the basis of the value NPC and the command injection duration TQ. Accordingly, on the basis of thus estimated delays delays TD and TDE, the ECU 40 can suitably estimate the actual injection duration TQDUR.

Furthermore, the ECU 40 sets the timing TADTIME, at which the value NPCDUR of the fuel pressure in the common rail 6 is to be determined, to the middle of the estimated actual injection duration TQDUR. Therefore, the value NPCDUR can accurately represent the mean value of the fuel pressure during the actual injection duration TQTUR; thus, the CPU 40 can suitably determine the variation ΔP.

In the present embodiment, the fuel injection system 1 is an asynchronous system where the cycle of the fuel injections by the injectors 10 is different from that of the fuel feeds by the fuel pump 4. Therefore, for each of the injectors 10, the behavior of the fuel pressure in the common rail 6 during the fuel injections by the injector 10 is different from that during the fuel injections by any other injector 10. Accordingly, if the command injection duration TQ was universally set for all the injectors 10, it would be impossible to suitably control all the fuel injections by the injectors 10. However, in the present embodiment, the command injection duration TQ is uniquely set for each of the injectors 10; thus it is possible to suitably control all the fuel injections by the injectors 10.

Second Embodiment

This embodiment illustrates a process of the CPU 41 of the ECU 40 for determining variations ΔP for each of the injectors 10. This process is similar to the process of the previous embodiment shown in FIG. 5; accordingly, only the difference between the two processes will be described hereinafter.

Figure 7:
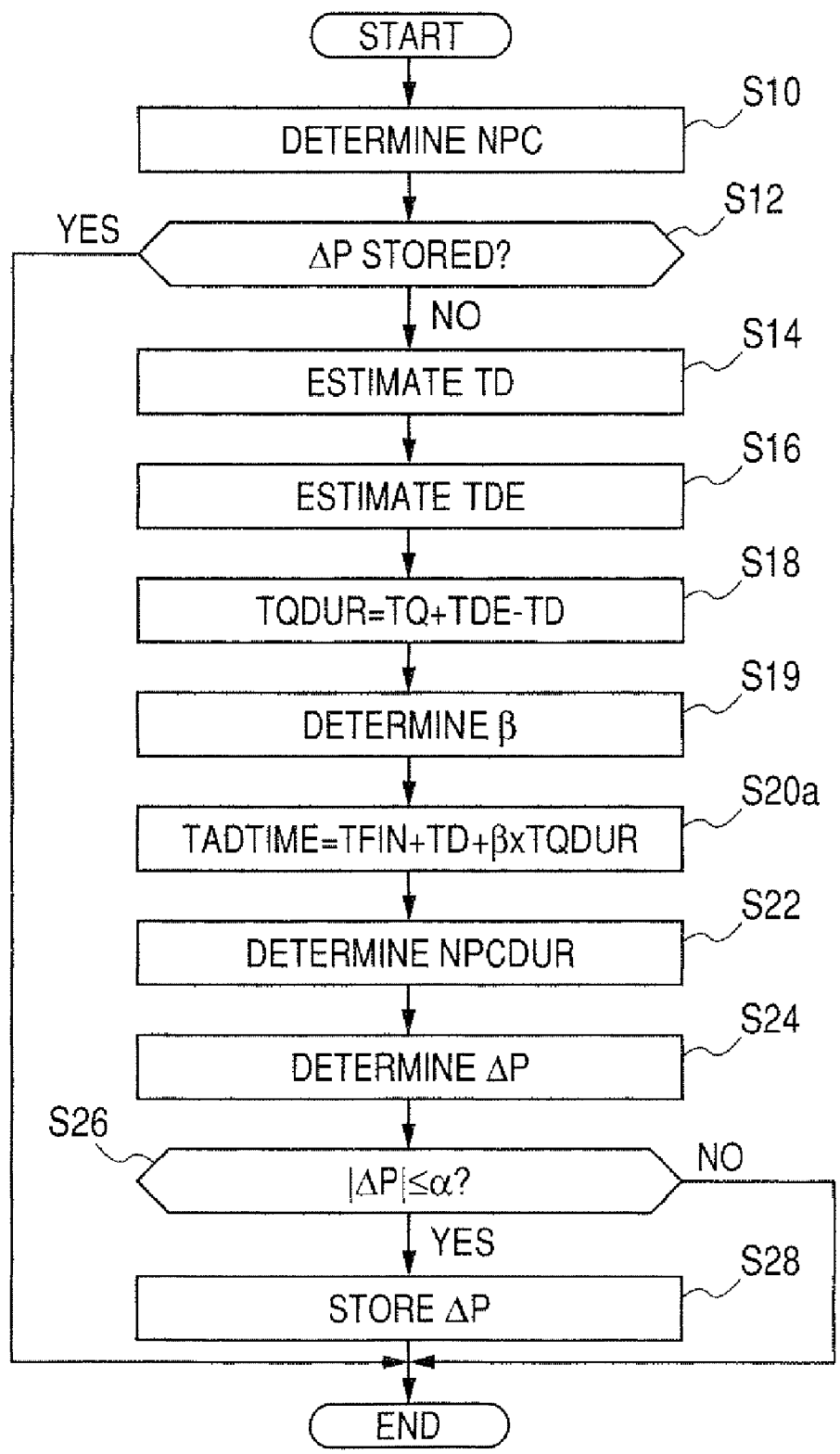
FIG. 7 is a flow chart illustrating a process of the ECU for determining the fuel pressure variations ΔP according to the second embodiment of invention.

FIG. 7 shows the process according to the present embodiment. This process is performed, instead of the process shown in FIG. 5, once for each of the fuel injections by the injector 10.

At step S19 of the process, the CPU 41 determines a coefficient β for the later setting of the timing TADTIME.

In the present embodiment, the coefficient β is so determined that the injector 10 will inject, for the time period of β×TQDUR beginning from the start of the actual injection duration TQDUR, a half of the command injection quantity QFIN.

Figure 8:
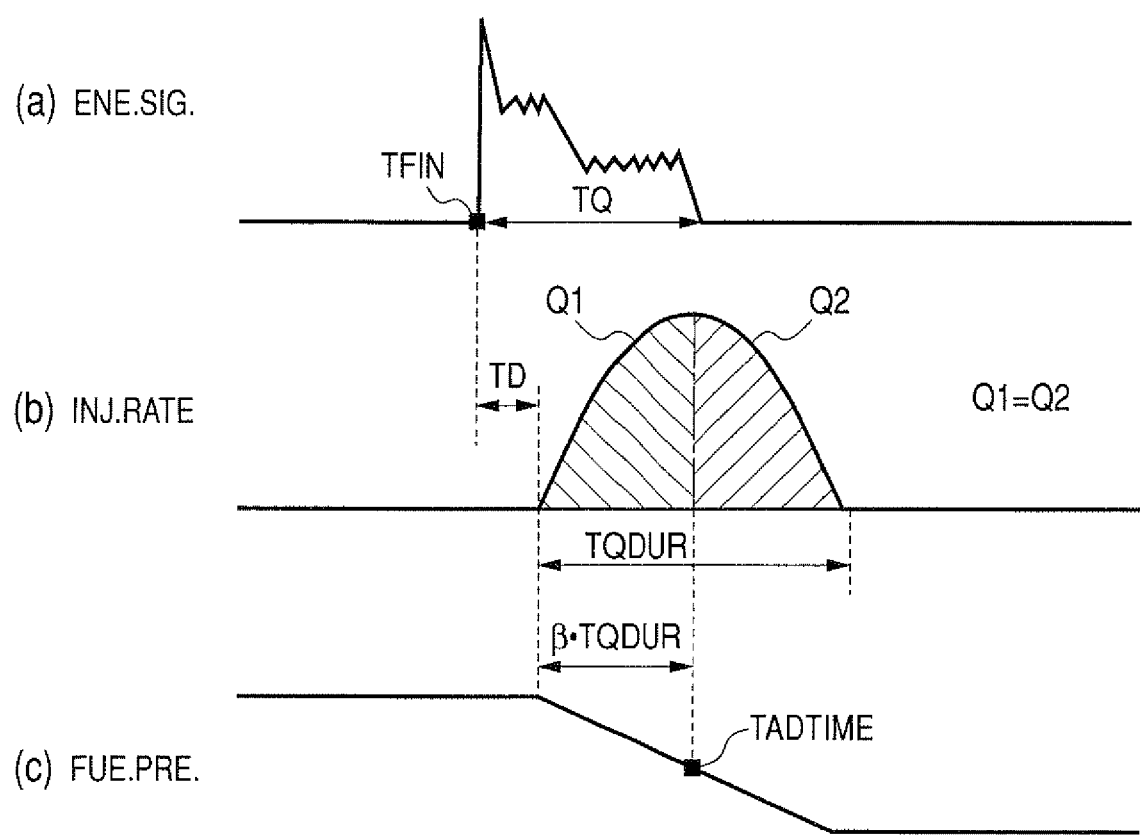
FIG. 8 is a graphical representation illustrating the setting of a timing for determining the fuel pressure in the common rail according to the second embodiment.

That is, as shown in FIG. 8, Q1=Q2=QFIN/2, where Q1 represents the quantity of fuel injected for the time period of β×TQDUR beginning from the start of the duration TQDUR, and Q2 represents the quantity of fuel injected for the left part of the duration TQDUR.

More specifically, in the present embodiment, the CPU 41 determines, by means of a map stored in the memory 42, the coefficient β on the basis of the time interval between the last and upcoming fuel injections, the command injection duration TQ, the command injection start timing TFIN, and the value NPC of the fuel pressure in the common rail 6 determined at step S10.

The time interval is used here as a parameter reflecting the influence of the fuel pressure fluctuation in the common rail 6 caused by the last fuel injection on the fuel pressure in the common rail 6 during the upcoming fuel injection. Accordingly, by taking into account the time interval, it is possible to suitably set the timing TADTIME regardless of the fuel pressure fluctuation.

The command injection duration TQ and the command injection start timing TFIN are both related to the differences in crank angle between the fuel injections by the injectors 10 and the fuel feeds by the plungers of the fuel pump 4. As described previously, during each of the fuel injections by the fuel injectors 10, the behavior of the fuel pressure in the common rail 6 depends not only on the fuel injection by the injector 10 but also on the fuel feed by either of the plungers of the fuel pump 4. Accordingly, by taking into account the parameters TQ and TFIN, it is possible to suitably set the timing TADTIME regardless of the differences in crank angle between the fuel injections and the fuel feeds.

The behavior of the fuel pressure in the common rail 6 during the upcoming fuel injection also depends on the fuel pressure before the upcoming fuel injection. Accordingly, by taking into account the value NPC of the fuel pressure, it is possible to suitably set the timing TADTIME regardless of the fuel pressure in the common rail 6 before the upcoming fuel injection.

At succeeding step S20a, the CPU 41 sets the timing TADTIME, at which the value NPCDUR of the fuel pressure in the common rail 6 is to be determined, by the following equation:

$$TADTIME = TFIN + TD + \beta \times TQDUR \quad \text{(EQUATION 4)}$$

where TD represents the delay of the actual injection start timing with respect to the command injection start timing TFIN, as shown in FIG. 8.

The other steps of the process according to the present embodiment are the same as those of the process described in the previous embodiment; therefore, the description thereof is omitted here for avoiding redundancy.

According to the present embodiment, the following advantages can be further achieved in addition to those described in the previous embodiment.

In the present embodiment, the value NPCDUR of the fuel pressure in the common rail 6 is determined at the timing TADTIME when the injector 10 has just injected a half of the command injection quantity QFIN. Therefore, the determined value NPCDUR can accurately represent the mean value of the fuel pressure during the actual injection duration TQDUR; thus, the CPU 40 can suitably determine the variation ΔP on the basis of the value NPCDUR.

In the present embodiment, the coefficient β is determined on the basis of the time interval between the last and upcoming fuel injections, the command injection duration TQ, the command injection start timing TFIN, and the value NPC of the fuel pressure in the common rail 6. Accordingly, the CPU 40 can suitably determine coefficient β, and thus can suitably set the timing TADTIME using the coefficient β.

Third Embodiment

This embodiment illustrates a process of the CPU 41 of the ECU 40 for determining variations ΔP for each of the injectors 10. This process is similar to the process of the first embodiment shown in FIG. 5; accordingly, only the difference between the two processes will be described hereinafter.

Figure 9:
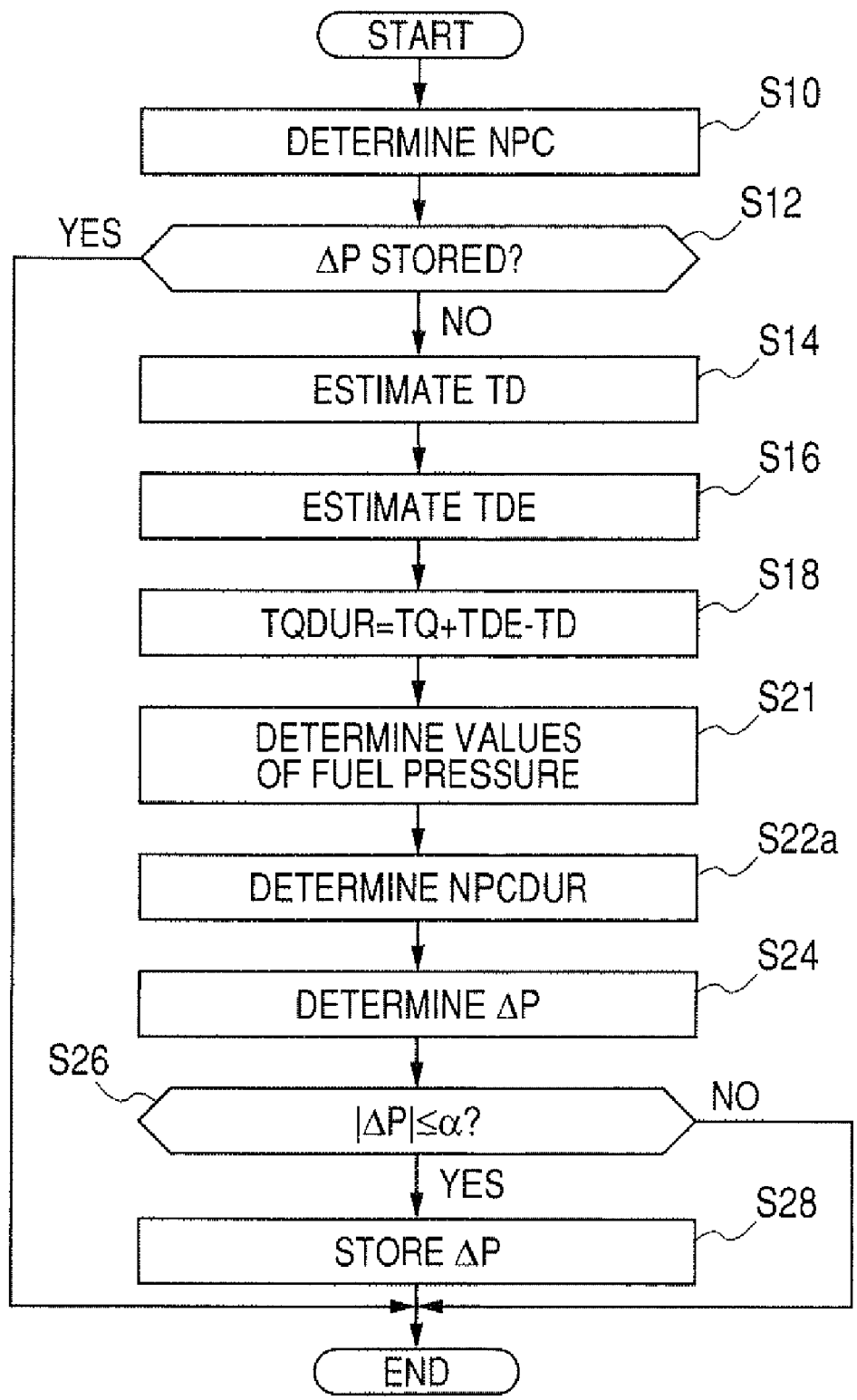
FIG. 9 is a flow chart illustrating a process of the ECU for determining the fuel pressure variations ΔP according to the third embodiment of invention.

FIG. 9 shows the process according to the present embodiment. This process is performed, instead of the process shown in FIG. 5, once for each of the fuel injections by the injector 10.

At step S21 of the process, the CPU 41 determines, during the actual injection duration TQDUR, a plurality of values of the fuel pressure in the common rail 6 on the basis of the signal output from the pressure sensor 7.

At step S22a, the CPU 41 determines the value NPCDUR of the fuel pressure as the arithmetic average of the plurality of values determined at step S21.

At succeeding step S24, the CPU 41 determines the variation ΔP that corresponds to the current operating condition of the engines by subtracting the value NPC determined at step S10 from the value NPCDUR determined at step S22a.

The other steps of the process according to the present embodiment are the same as those of the process described in the first embodiment; therefore, the description thereof is omitted here for avoiding redundancy.

As above, in the present embodiment, the value NPCDUR of the fuel pressure in the common rail 6 is determined as the average of the plurality of values determined during the actual injection duration TQDUR. Therefore, the determined value NPCDUR can accurately represent the mean value of the fuel pressure during the actual injection duration TQTUR; thus, the CPU 40 can suitably determine the variation ΔP on the basis of the value NPCDUR.

Other Embodiments

While the above particular embodiments have been shown and described, it will be understood by those skilled in the art that various modifications, changes, and improvements may be made without departing from the spirit of the invention.

1) In the previous embodiments, the delays TD and TDE are estimated on the basis of the value NPC of the fuel pressure in the common rail 6 which is determined prior to the command injection start timing TFIN.

However, the delays TD and TDE also can be estimated on the basis of a value of the fuel pressure in the common rail 6 which is determined at the command injection start timing TFIN.

Further, in the case of setting the command injection duration TQ on the basis of ΔP only for the main injections of the injectors 10, as in the previous embodiments, the delay TDE can be estimated based only on the value NPC of the fuel pressure on the assumption that the nozzle needle 14 in each of the injectors 10 is lifted at maximum during the actual fuel injections.

2) In the second embodiment, the coefficient β also can be determined in a way different from that shown in FIG. 5. For example, the coefficient β can be predetermined through experimentation so that with the resultant timing TADTIME, it is possible to compensate for the differences in injection quantity between the injectors 10.

Further, it is also possible to determine the coefficient β based only on part of those parameters which include, as described in the second embodiment, the time interval, the command injection duration TQ, the command injection start timing TFIN, and the value NPC of the fuel pressure in the common rail 6.

3) In the third embodiment, the value NPCDUR of the fuel pressure is determined as the arithmetic average of the plurality of values of fuel pressure determined during the actual injection duration TQDUR.

However, the value NPCDUR also can be determined as a weighted average of the plurality of values which is obtained by giving each of the values a weight in proportional to the injection rate at the timing when the value is determined.

4) In the previous embodiments, the variations ΔP are determined for each of the injectors 10 by one of the processes shown in FIGS. 5, 7, and 9.

However, it is also possible to determine, for each of the injectors 10, two variations ΔP respectively at timings of (720° CA) and (1040° CA). In this way, each of the variations ΔP can be determined based on which one of the two plungers of the fuel pump 4 is closer to the compression top dead center of the corresponding cylinder.

5) In the previous embodiments, the fuel injection system S1 is an asynchronous system where the cycle of the fuel injections by the injectors 10 is different from that of the fuel feeds by the fuel pump 4.

However, the present invention also can be applied to a synchronous fuel injection system where the cycle of the fuel injections by the injectors 10 is equal to that of the fuel feeds by the fuel pump 4. In this case, though the same variations ΔP may be used for all the injectors 10, it is still preferable to separately determine the variations ΔP for each of the injectors 10 for more suitable control.

6) In the previous embodiments, an integral multiple of the cycle of the fuel deeds by the fuel pump 4 is equal to one combustion cycle (i.e., 720°).

However, the present invention also can be applied to such a fuel injection system where no integral multiple of the cycle of the fuel deeds by the fuel pump 4 is equal to one combustion cycle. In this case, it is possible to take the least common multiple of the cycle of the fuel injections by the injectors 10 and the cycle of the fuel feeds by the fuel pump 4 as one variation determination cycle in which a variation ΔP is determined and stored.

7) In the previous embodiments, the fuel pressure in the common rail 6 during the fuel injections by the injectors 10 is estimated on the basis of the variations ΔP. More specifically, each of the variations ΔP is determined as the difference between the values NPCDUR and NPC of the fuel pressure in the common rail 6 which are determined for a previous fuel injection; the fuel pressure in the common rail 6 during an upcoming fuel injection is estimated as the sum of ΔP and the value NPC that is newly determined for the upcoming fuel injection.

However, it is also possible to: determine the ratio between the values NPCDUR and NPC which are determined for a previous fuel injection; and estimate the fuel pressure in the common rail 6 during an upcoming fuel injection as the product of the ratio and the value NPC that is newly determined for the upcoming fuel injection.

8) In the previous embodiments, the operating regions of the engine are divided according to the fuel pressure in the common rail 6 and the injection quantity of the injectors 10. However, the operating regions may also be divided according only to either of the two parameters.

Moreover, when the fuel pressure in the common rail 6 can be determined as a function of the rotational speed of the engine and the injection quantity of the injectors 10, the operating regions of the engine may also be divided according to either the rotational speed and the injection quantity or the rotational speed and the fuel pressure in the common rail 6.

9) In the previous embodiments, each of the injectors 10 is configured to include, as shown in FIG. 1, the back pressure chamber 20 and the valve 26 that fluidically connects and disconnects the back pressure chamber 20 to and from the low-pressure passage 24. With such a configuration, it is easy for the above-described delays TD and TDE to occur during the actual fuel injections. Accordingly, it is particularly effective to determine and store the variations ΔP for setting the command injection duration TQ for the latter fuel injections.

However, when the delays TD and TDE so small that they can be neglected, it is also possible to use the variations ΔP to correct or renew the command injection duration TQ for the ongoing fuel injections during which the variations ΔP are respectively determined and stored.

10) In the previous embodiments, the variations ΔP are stored in the RAM 44. However, it is also possible to store the variations ΔP in the memory 42 instead of the RAM 44.

11) In the previous embodiments, the fuel injection system S1 is used for the diesel engine which is a compression ignition engine. However, the present invention also can be applied to a direct injection gasoline engine.

What is claimed is:

1. A control apparatus for controlling a fuel injection apparatus, the fuel injection apparatus comprising:
   an accumulator that accumulates high-pressure fuel;
   at least one injector that injects the high-pressure fuel accumulated in the accumulator into a cylinder of an internal combustion engine; and
   a pressure sensor that senses fuel pressure in the accumulator and outputs a signal indicative of the sensed fuel pressure,
   the control apparatus comprising:
   an estimator that estimates an actual injection duration of the injector;
   a determiner that determines, during the actual injection duration estimated by the estimator, a value of the fuel pressure in the accumulator based on the signal output from the pressure sensor; and
   a setter that sets a manipulated variable for controlling fuel injection quantity of the injector based on the value of the fuel pressure determined by the determiner.

2. The control apparatus as set forth in claim 1, further comprising a memory that stores at least one piece of information, the piece of information being on the value of the fuel pressure determined by the determiner,
   wherein the injector cyclically injects the high-pressure fuel accumulated in the accumulator into the cylinder of the engine, and
   the setter sets, based on the piece of information stored in the memory, the manipulated variable for a next fuel injection that is to be made by the injector after the actual injection duration during which the value of the fuel pressure is determined.

3. The control apparatus as set forth in claim 2, wherein the piece of information indicates a difference between the value of the fuel pressure determined during the actual injection duration and a second value of the fuel pressure in the accumulator, the second value being determined by the determiner, based on the signal output from the pressure sensor, at a timing earlier than the actual injection duration by a predetermined crank angle, the determiner further determines, at a timing earlier than the next fuel injection by the predetermined crank angle, a third value of the fuel pressure in the accumulator based on the signal output from the pressure sensor, and the setter sets, based on the piece of information and the third value of the fuel pressure determined by the determiner, the manipulated variable for the next fuel injection.

4. The control apparatus as set forth in claim 2, wherein the engine has a plurality of cylinders, and the fuel injection apparatus includes a plurality of injectors each of which injects the high-pressure fuel accumulated in the accumulator into a corresponding one of the cylinders of the engine, the memory stores, for each of the injectors, a piece of information on a value of the fuel pressure in the accumulator which is determined by the determiner, based on the signal output from the pressure sensor, during an actual injection duration of the injector estimated by the estimator, the setter sets, for each of the injectors, the manipulated variable for a next fuel injection, which is to be made by the injector after the actual injection duration of the injector, based on the piece of information stored in the memory for the injector.

5. The control apparatus as set forth in claim 4, wherein the fuel injection apparatus further includes a pump that is driven by an output shaft of the engine, and suction and discharge strokes of the pump are determined as a function of rotation angle of the output shaft of the engine.

6. The control apparatus as set forth in claim 2, wherein the engine has a plurality of operating regions, and the memory stores, for each of the operating regions of the engine, a piece of information on a value of the fuel pressure in the accumulator which is determined by the determiner during an actual injection duration of the injector with the engine operating in the operating region, the setter sets, for each of the operating regions of the engine, the manipulated variable for a next fuel injection, which is to be made by the injector with the engine operating in the operating region, based on the piece of information stored in the memory for the operating region.

7. The control apparatus as set forth in claim 6, wherein the operating regions of the engine are divided according to at least one of the fuel pressure in the accumulator and the fuel injection quantity of the injector.

8. The control apparatus as set forth in claim 1, wherein the determiner determines the value of the fuel pressure in the accumulator at the middle of the actual injection duration of the injector.

9. The control apparatus as set forth in claim 1, wherein the determiner determines the value of the fuel pressure in the accumulator when the injector has injected a half of a command injection quantity.

10. The control apparatus as set forth in claim 1, wherein the determiner further determines, during the actual injection duration of the injector, a plurality of values of the fuel pressure in the accumulator based on the signal output from the pressure sensor, and the setter sets the manipulated variable based on an average of all the values of the fuel pressure determined by the determiner.

11. The control apparatus as set forth in claim 1, wherein the estimator further estimates:

a first delay of an actual injection start timing with respect to a command injection start timing based on a second value of the fuel pressure in the accumulator, the second value being determined by the determiner prior to the actual injection duration, a second delay of an actual injection end timing with respect to a command injection end timing based on a command injection duration and the second value of the fuel pressure, and the actual injection duration based on the first and second delays and the command injection duration.

12. The control apparatus as set forth in claim 1, wherein the injector cyclically injects the high-pressure fuel accumulated in the accumulator into the cylinder of the engine, and the determiner determines the value of the fuel pressure in the accumulator at a timing that is determined based on at least one of a time interval, a command injection duration, a command injection start timing, and a second value of the fuel pressure in the accumulator, the time interval being between a last fuel injection of the injector and the actual injection duration estimated by the estimator, the second value being determined by the determiner in the time interval.

13. The control apparatus as set forth in claim 1, wherein the engine has a plurality of cylinders, and the fuel injection apparatus includes a plurality of injectors each of which injects the high-pressure fuel accumulated in the accumulator into a corresponding one of the cylinders of the engine, the fuel injection apparatus further includes a pump that cyclically feeds the high-pressure fuel into the accumulator, and a cycle of the fuel injections by the injectors is different from that of the fuel feeds by the pump.

14. The control apparatus as set forth in claim 1, wherein the injector cyclically injects the high-pressure fuel accumulated in the accumulator into the cylinder of the engine, and the manipulated variable is a command injection duration for a next fuel injection that is to be made by the injector after the actual injection duration during which the value of the fuel pressure is determined.

15. A fuel injection system comprising a fuel injection apparatus and a control apparatus, the fuel injection apparatus comprising:

an accumulator that accumulates high-pressure fuel;

at least one injector that injects the high-pressure fuel accumulated in the accumulator into a cylinder of an internal combustion engine; and a pressure sensor that senses fuel pressure in the accumulator and outputs a signal indicative of the sensed fuel pressure, the control apparatus comprising:

an estimator that estimates an actual injection duration of the injector;

a determiner that determines, during the actual injection duration estimated by the estimator, a value of the fuel pressure in the accumulator based on the signal output from the pressure sensor; and a setter that sets a manipulated variable for controlling fuel injection quantity of the injector based on the value of the fuel pressure determined by the determiner.

16. A method of controlling a fuel injection apparatus having (i) an accumulator that accumulates high-pressure fuel, (ii) at least one injector that injects the high-pressure fuel accumulated in the accumulator into a cylinder of an internal combustion engine, and (iii) a pressure sensor that senses fuel pressure in the accumulator and outputs a signal indicative of the sensed fuel pressure, the method comprising:

estimating an actual injection duration of the injector;

determining, during the actual injection duration estimated in said estimating, a value of the fuel pressure in the accumulator based on the signal output from the pressure sensor; and setting a manipulated variable for controlling fuel injection quantity of the injector based on the determined value of the fuel pressure determined.

17. The method as set forth in claim 16, further comprising:

storing in a memory at least one piece of information, the piece of information being on the determined value of the fuel pressure, wherein the injector cyclically injects the high-pressure fuel accumulated in the accumulator into the cylinder of the engine, and said setting includes setting, based on the piece of information stored in the memory, the manipulated variable for a next fuel injection that is to be made by the injector after the actual injection duration during which the value of the fuel pressure is determined.

18. The method as set forth in claim 17, wherein the piece of information indicates a difference between the value of the fuel pressure determined during the actual injection duration and a second value of the fuel pressure in the accumulator, the second value being determined based on the signal output from the pressure sensor, at a timing earlier than the actual injection duration by a predetermined crank angle, said determining further includes determining, at a timing earlier than the next fuel injection by the predetermined crank angle, a third value of the fuel pressure in the accumulator based on the signal output from the pressure sensor, and said setting includes, based on the piece of information and the third value of the fuel pressure, the manipulated variable for the next fuel injection.

19. The method as set forth in claim 16, wherein the value of the fuel pressure in the accumulator is determined at the middle of the actual injection duration of the injector.

20. The method as set forth in claim 16, wherein the value of the fuel pressure in the accumulator is determined when the injector has injected a half of a command injection quantity.

* * * * *